US012054945B2

(12) United States Patent
Line

(10) Patent No.: US 12,054,945 B2
(45) **Date of Patent: *Aug. 6, 2024**

(54) METHOD OF MANUFACTURING OSB WITH EXTRUDED POLYMER BANDS

(71) Applicant: LOUISIANA-PACIFIC CORPORATION, Nashville, TN (US)

(72) Inventor: Jarrod Kevin Line, Brentwood, TN (US)

(73) Assignee: LOUISIANA-PACIFIC CORPORATION, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,046

(22) Filed: Nov. 22, 2022

(65) Prior Publication Data

US 2023/0160204 A1 May 25, 2023

Related U.S. Application Data

(63) Continuation of application No. 16/412,599, filed on May 15, 2019, now Pat. No. 11,505,942.

(60) Provisional application No. 62/671,508, filed on May 15, 2018.

(51) Int. Cl.

*E04C 2/00* (2006.01)
*B27K 3/08* (2006.01)
*E04B 1/86* (2006.01)
*E04C 2/12* (2006.01)
*E04C 2/24* (2006.01)

(52) U.S. Cl.

CPC ................ *E04C 2/243* (2013.01); *B27K 3/08* (2013.01); *E04B 1/86* (2013.01); *E04C 2/12* (2013.01)

(58) Field of Classification Search

CPC ..... B27K 3/08; E04B 1/86; E04B 5/12; E04B 2103/04; E04C 2/12; E04C 2/243; E04C 2/16; Y10T 29/49947; E04F 13/16; E04F 21/18; E04G 21/1891; E04D 15/025

See application file for complete search history.

(56) References Cited

U.S. PATENT DOCUMENTS 7,921,965 B1 * 4/2011 Surace .................... E04B 9/045 181/290
8,181,738 B2 * 5/2012 Tinianov ................... B32B 7/12 181/290
8,424,251 B1 * 4/2013 Tinianov ................. B32B 37/12 52/144
10,174,499 B1 * 1/2019 Tinianov .............. G10K 11/168
10,482,864 B1 * 11/2019 Johnson ................ E04H 17/066
10,640,971 B1 * 5/2020 Kuznar ................... E04B 9/001

(Continued)

FOREIGN PATENT DOCUMENTS

IT 0846812 * 11/1997 ............... E04B 1/86

*Primary Examiner* — Chi Q Nguyen

(74) *Attorney, Agent, or Firm* — Wayne Edward Ramage; Baker Donelson

(57) ABSTRACT

A system for introducing a noise-dampening polymer in-line in the manufacturing process of a manufactured wood product to achieve higher acoustic performance in siding, sheathing, roofing, flooring, and similar applications using the manufactured wood product. Several lines or bands of the noise-dampening polymer are deposited transversely across one side or face of the product. The polymer is deposited where the product is expected to contact joists or studs. The polymer may be a viscoelastic polymer.

11 Claims, 3 Drawing Sheets panel with polymer/dampening bands

(56) References Cited

U.S. PATENT DOCUMENTS

| | | | | |
|---|---|---|---|---|
| 11,746,534 | B2 * | 9/2023 | Cusa | E04B 1/99<br>428/40.1 |
| 2011/0168484 | A1 * | 7/2011 | Lenz | E04B 1/86<br>181/288 |
| 2016/0230395 | A1 * | 8/2016 | Cusa | E04F 13/14 |
| 2016/0340914 | A1 * | 11/2016 | Edmonds | E04B 1/8409 |
| 2019/0186125 | A1 * | 6/2019 | Edmonds | E04B 1/8209 |
| 2020/0011056 | A1 * | 1/2020 | Patterson | G10K 11/16 |
| 2020/0024844 | A1 * | 1/2020 | Jacek | B27N 3/002 |
| 2021/0180322 | A1 * | 6/2021 | Busche | B32B 5/022 |
| 2021/0245471 | A1 * | 8/2021 | Pham | E04B 9/001 |
| 2021/0285230 | A1 * | 9/2021 | Baert | E04F 15/102 |
| 2021/0292237 | A1 * | 9/2021 | Baert | C04B 24/06 |
| 2022/0025658 | A1 * | 1/2022 | Kell | E04F 15/0215 |
| 2023/0048280 | A1 * | 2/2023 | Drexler | B32B 27/12 |

* cited by examiner

OSB Panel in flooring assembly

METHOD OF MANUFACTURING OSB WITH EXTRUDED POLYMER BANDS

This application is a continuation of U.S. patent application Ser. No. 16/412,599, filed May 15, 2019, now U.S. Pat. No. 11,505,942, which claims benefit of and priority to U.S. Provisional App. No. 62/671,508, filed May 15, 2018, both of which are incorporated herein in their entireties by specific reference for all purposes.

FIELD OF INVENTION

This invention relates to a method and system for manufacturing wood products (such as OSB, oriented strand board) with acoustic dampening polymer bands.

BACKGROUND OF THE INVENTION

Acoustic comfort is important in building design. Noise is the often the primary complaint by home owners in residential single-family homes, and noise reduction also is an important performance criterion in multi-family and commercial construction (particularly in the healthcare and education segments). Airborne noise/STC (Sound Transmission Class) rating and impact noise (Impact Insulation Class, IIC) rating in wall and floor or ceiling assemblies often is specified in codes and standards by ANSI, IgCC and LEED.

Airborne noise from outside or inside the living space has been addressed with various field-applied and pre-fabricated noise dampening constructions products, such as resilient channels, clips, staggered studs, multiple layers of drywall, wall cavity insulation, and laminated acoustic drywall. In flooring, wall, and ceiling structures, “resilient channels” are often used (and are required in some types of constructions), which reduce the transmission of airborne sound by placing or suspending a material from a stud or joint.

However, there are no building materials, such as OSB-based siding, sheathing, roofing or flooring, that apply a sound dampening material in the primary manufacturing process of panels with improved acoustic performance.

DETAILED DESCRIPTION OF EXEMPLARY EMBODIMENTS

In various exemplary embodiments, the present invention comprises a method or process for manufacturing wood products with acoustic dampening properties. The manufactured wood products include, but are not limited to, oriented strand board (OSB), laminated strand lumber (LSL), medium-density fiberboard (MDF), particleboard, or various similar wood composites.

In several embodiments, the present invention comprises a system for introducing a noise-dampening polymer in-line in the manufacturing process of a manufactured wood product to achieve higher acoustic performance (e.g., Sound Transmission Class-STC and/or Impact Insulation Class-IIC rating) in siding, sheathing, roofing, flooring, and similar applications using the manufactured wood product. The polymer may be a viscoelastic polymer.

Several lines or bands of the noise-dampening polymer are deposited transversely across one side or face of the product (e.g., OSB panel). The polymer is deposited where the product is expected to contact joists or studs. Accordingly, in several embodiments the polymer lines or bands are applied on the side/face of the product opposite nail lines, which typically are indicated or marked on the outward or upward facing side of the panel.

Figure 1:
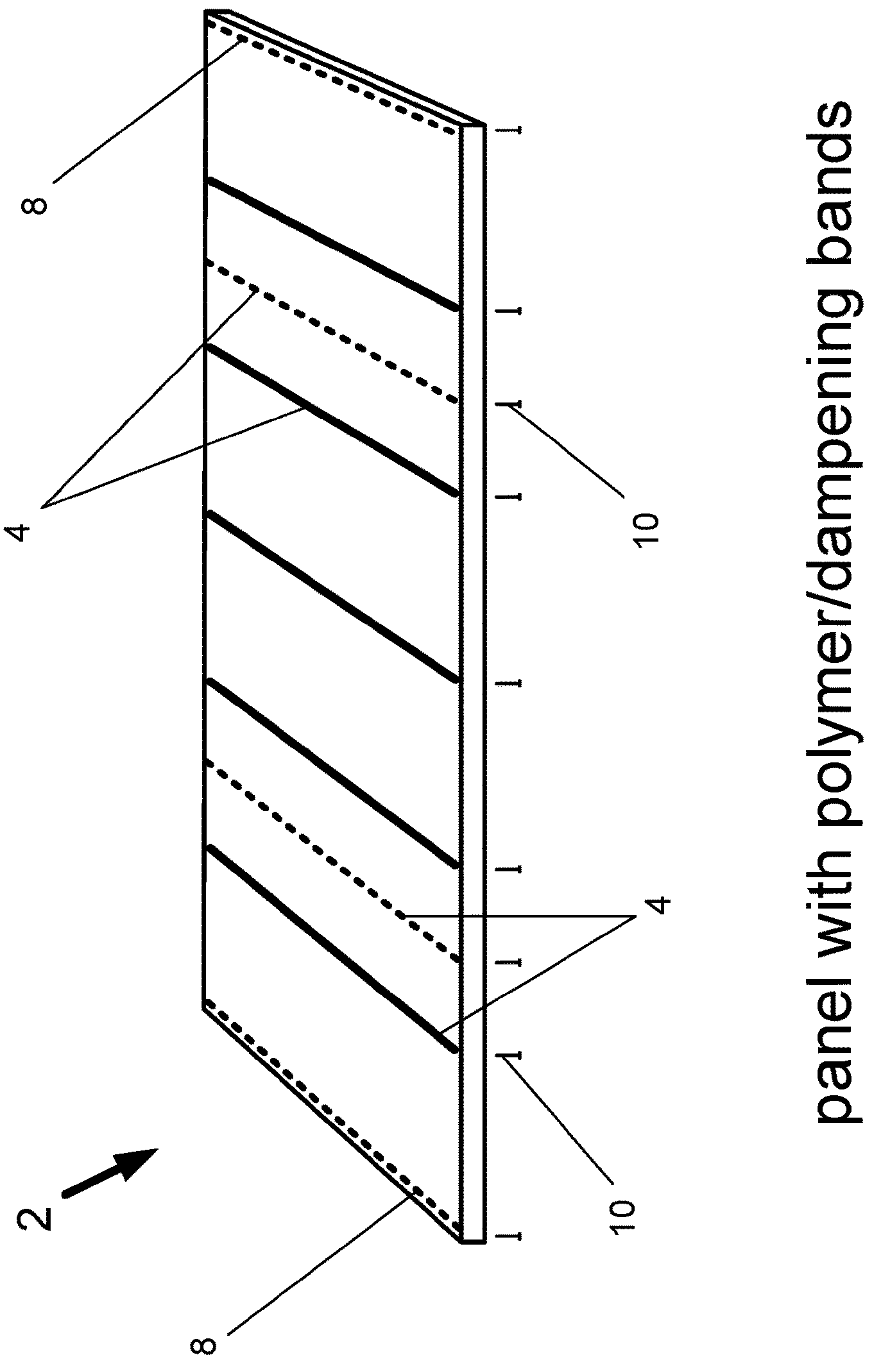
FIG. 1 shows a view of an OSB panel with lines or bands of sound-dampening polymer in accordance with an embodiment of the present invention.
Figure 2:
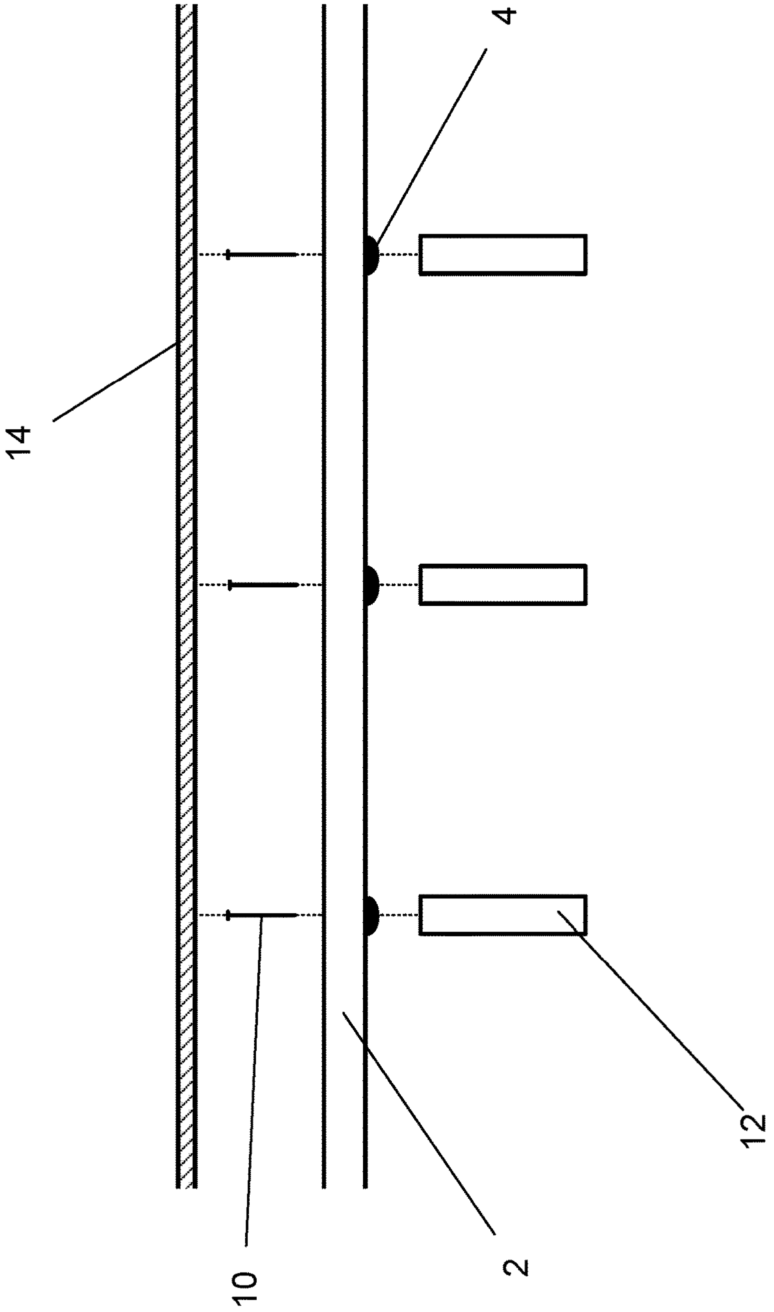
FIG. 2 shows a cutaway view of the OSB panel of FIG. 1 being installed as a flooring panel.

FIG. 1 shows an example of a bottom face of an OSB panel 2 with lines of sound dampening polymer 4 applied at multiples of 16 inches, 24 inches, and 48 inches from an edge (parallel to the polymer lines), as well as along each corresponding edge 8 of the panel. This arrangement is beneficial as the edges of the OSB panel are typically lined up with underlying floor joists during construction, with intervening joists typically spaced every 16, 24 or 48 inches. When installed, the corresponding sound dampening polymer lines rest on top of the joists, acting as a sound dampening barrier between the panel and the joists (i.e., the polymer application along the face opposite the nail lines provides dampening material in the areas of the interface with the floor joists, as nails 10 are applied during construction to secure the OSB panel 4 to the joists 12, as seen in FIG. 2). An overlay 16, such as carpet, tile or other floor covering known in the art, may then be added over the installed OSB panel subflooring.

When multiple polymer lines are applied at variable spacing, as seen in FIG. 1, only the polymer lines that correspond to particular joist spacing will be in contact with a joist or joists. The remaining lines essentially are unused, although they may provide some benefit if in contact with cross-joints or end members. In alternative embodiments, a product may be produced with polymer lines at set spacing intervals, so that a user would select the product with appropriately-spaced lines for use based on the joist spacing.

The polymer may be heat cured or hot melt (i.e., thermoplastic). In one embodiment, the polymer is applied post-press on the main manufacturing line, or through a post-application process off-line. The lines or bands can be continuous, or intermittent (i.e., dots or streaks) (examples of both types of lines are shown in FIG. 1), and may be applied with overhead linear applications or sprayers. In some additional embodiments, additional polymer may be added in-between the standard spaced lines (as described above). The additional polymer may help in providing a sound barrier in cases where joists are not straight or are misaligned.

Figure 3:
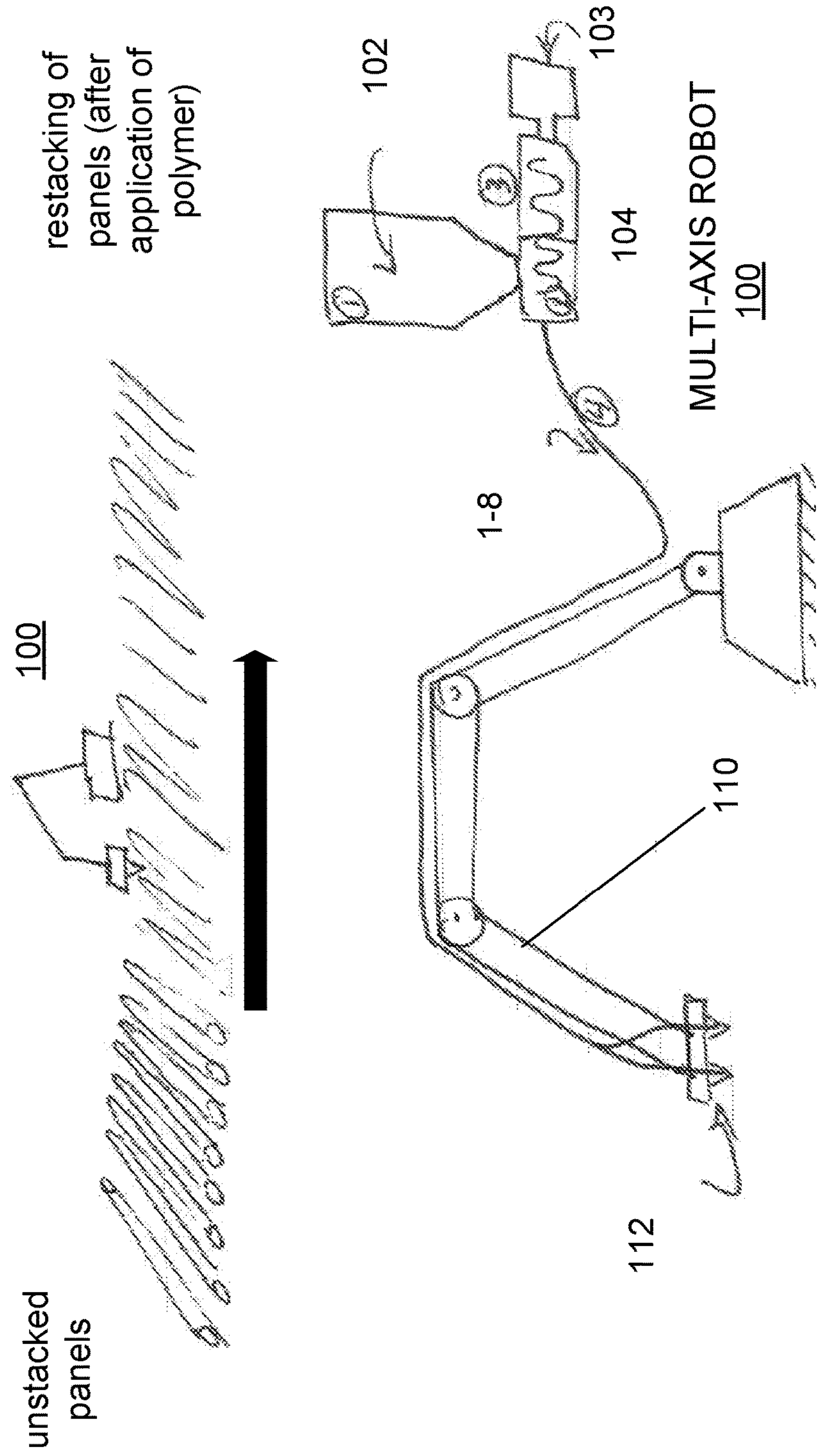
FIG. 3 shows an embodiment of a robotic polymer or plastic extruder device.

FIG. 3 shows a multi-axis robotic device 100 suitable for in-line use for application of the polymer to unstacked panels. Low cost injection molded plastics (e.g., HDPE, LDPE, PP, and so on) are fed in bead or spherical form from a bead hopper 102 into a heating element in an injection molding mechanism 104, and then extruded by means of a motor-driven 103 screw. The liquefied plastic travels through a heat-traced, heat-jacketed, flexible, high-pressure tube(s) or line(s) 108 disposed on a multi-axis robotic arm 110 to an extruder nozzle or nozzles 112 at the end of the arm system.

The extruder nozzles can range in size from 1 mm to 20 mm (e.g., orifice size), and can apply a variety of thickness, widths and patterns to the panel. It should be noted that while this device can be used to apply the bands or lines as described above, it also be used to more flexibly apply polymer features to wood or other panel products or substrates (e.g., ventilated siding, acoustic OSB, and the like) for a variety of purposes.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A product with acoustic dampening properties, comprising:

a manufactured wood product with a first edge, a second edge, a front face, and a back face;

a plurality of pieces of noise-dampening polymer, each piece of noise-dampening polymer affixed in a location on the back face, wherein at least two of the plurality of pieces of noise-dampening polymer are spaced at pre-determined distances from the first edge of the manufactured wood product and each other.

2. The product of claim 1, wherein the locations comprise a first location proximate the first edge, and a second location proximate the second edge, wherein the second edge is opposite and parallel to the first edge.

3. The product of claim 1, wherein the polymer is applied in a continuous line in at least one of the locations.

4. The product of claim 1, wherein the polymer is applied intermittently in at least one of the locations.

5. The product of claim 1, wherein two or more pieces of the polymer are applied in lines parallel to each other.

6. The product of claim 5, wherein the lines are parallel to the first edge.

7. The product of claim 6, wherein the lines are spaced at multiples of 16 inches, 24 inches, and/or 48 inches from the first edge.

8. The product of claim 6, wherein the lines are directly opposite a plurality of nail lines indicated on the front face of the manufactured wood product.

9. The product of claim 1, wherein said spacing is selected based on a corresponding spacing of joists, studs, or other flooring or framing support elements.

10. The product of claim 1, wherein the polymer comprises a viscoelastic polymer.

11. The product of claim 1, wherein the polymer is heat cured or hot melt.

* * * * *